(12) United States Patent
Yun et al.

(10) Patent No.: US 12,088,784 B2
(45) Date of Patent: Sep. 10, 2024

(54) THERMAL IMAGING CAMERA AND SHUTTER OPERATION STATE MONITORING METHOD THEREOF

(71) Applicant: HANWHA TECHWIN CO., LTD., Seongnam-si (KR)

(72) Inventors: Ki Bong Yun, Seongnam-si (KR); Ji Soo Lim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 188 days.

(21) Appl. No.: 17/971,558

(22) Filed: Oct. 22, 2022

(65) Prior Publication Data

US 2023/0128886 A1   Apr. 27, 2023

(30) Foreign Application Priority Data

Oct. 27, 2021   (KR) .................. 10-2021-0144466

(51) Int. Cl.
| | | |
|---|---|---|
| H04N 17/00 | (2006.01) | |
| G01J 5/0804 | (2022.01) | |
| G01J 5/90 | (2022.01) | |
| G03B 43/00 | (2021.01) | |
| G06T 5/80 | (2024.01) | |
| H04N 23/23 | (2023.01) | |
| H04N 23/63 | (2023.01) | |
| H04N 23/73 | (2023.01) | |
| H04R 1/02 | (2006.01) | |
| H04R 1/08 | (2006.01) | |
| G01J 5/00 | (2022.01) | |

(52) U.S. Cl.
CPC .............. *H04N 17/002* (2013.01); *G01J 5/90* (2022.01); *G06T 5/80* (2024.01); *H04N 23/634* (2023.01); *H04R 1/028* (2013.01); *H04R 1/08* (2013.01); *G01J 2005/0077* (2013.01); *G06T 2207/10048* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 2009/0273675 A1 | 11/2009 | Jonsson | |
| 2021/0176457 A1* | 6/2021 | Winzell | .................. G01J 5/025 |

FOREIGN PATENT DOCUMENTS

| | | |
|---|---|---|
| JP | 5833477 B2 | 9/2013 |
| KR | 101631241 B1 | 5/2016 |
| KR | 1020210070907 A | 6/2021 |

* cited by examiner

*Primary Examiner* — Christopher Braniff
(74) *Attorney, Agent, or Firm* — McLean IP Global; Jason Y. Pahng (57) ABSTRACT

A shutter operation state monitoring method performed in a thermal imaging camera includes, controlling a shutter of the thermal imaging camera to be closed, capturing a first thermal image, calculating a correction offset value for the first thermal image, controlling the shutter to be opened, capturing a second thermal image, applying the correction offset value to the second thermal image, measuring a sound with a microphone when controlling the shutter to be closed and/or when controlling the shutter to be opened, determining whether the measured sound matches an operation sound of the shutter, and outputting an alarm indicating malfunction of the shutter if the measured sound does not match the operation sound.

20 Claims, 9 Drawing Sheets

THERMAL IMAGING CAMERA AND SHUTTER OPERATION STATE MONITORING METHOD THEREOF

CROSS-REFERENCE TO RELATED APPLICATION

This application claims priority from Korean Patent Application No. 10-2021-0144466 filed on Oct. 27, 2021, in the Korean Intellectual Property Office, and all the benefits accruing therefrom under 35 U.S.C. 119, the contents of which in its entirety are herein incorporated by reference.

BACKGROUND

1. Field

The present disclosure relates to a shutter operation state monitoring method of a thermal imaging camera, and more particularly, to an apparatus and method for accurately detecting malfunction of a shutter of a thermal imaging camera.

2. Description of the Related Art

In general, in order to correct a thermal imaging sensor in a thermal imaging camera periodically or at any arbitrary time, the shutter must operate normally. If the shutter does not operate properly, an optimal thermal image may not be obtained. If the shutter malfunctions, for example, if the shutter is open when the sensor needs to be corrected, a correction offset value is calculated incorrectly so that the movement of a subject may appear as a ghost. On the contrary, if the sensor is corrected when the shutter is closed, the correction offset value may be calculated properly. However, if the shutter remains closed without being able to be opened because of its malfunction, only a single-color screen may be displayed.

In order to address these problems, Korean Patent Application Publication No. 10-2021-0070907 discloses a thermal image state monitoring sensor, which detects malfunction in a thermal imaging camera by comparing the difference between two average response values for two shutter images with a predetermined value. Specifically, the detection of malfunction in the thermal imaging camera includes the steps of: calculating a first average response value for a first shutter image captured by a thermal imaging sensor in the thermal imaging camera; calculating a second average response value for a second shutter image captured by the thermal imaging sensor in the thermal imaging sensor; comparing the first and second average response values; determining whether the difference between the first and second average response values exceeds the predetermined value; and determining that the shutter of the thermal imaging camera malfunctions and providing an indication of malfunction to a user, if the difference between the first and second average response values exceeds the predetermined value.

According to this prior art, even if a malfunction in which the shutter fails to be opened from its closed state occurs after obtaining the first and second shutter images, the malfunction may not be able to be automatically detected because the difference between the first and second average response values is less than the predetermined value. Also, even if a malfunction in which the shutter fails to be closed when capturing an image of a fixed subject whose temperature is uniformly maintained occurs, the malfunction may not be automatically detected because the difference between the first and second average response values is less than the predetermined value.

Therefore, a new approach is needed to determine whether a shutter of a thermal imaging camera operates normally by accurately sensing a state of malfunction of the shutter and notify a user of the malfunction of the shutter, instead of simply calculating the difference between average response values for shutter images.

SUMMARY

Aspects of the present disclosure provide a method of accurately monitoring the operation state of a shutter of a thermal imaging camera, without calculating the difference between average response values for shutter images, to correct a thermal imaging sensor of the thermal imaging camera periodically or at any arbitrary time.

Aspects of the present disclosure also provide a method of detecting malfunction of a thermal imaging camera with the use of the operation sound of a mechanical shutter to correct a thermal imaging sensor of the thermal imaging camera periodically or at any arbitrary time.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a shutter operation state monitoring method performed in a thermal imaging camera, which includes a processor and a memory storing instructions that can be executed by the processor, by the instructions under the control of the processor, the shutter operating state monitoring method including: controlling a shutter of the thermal imaging camera to be closed; capturing a first thermal image; calculating a correction offset value for the first thermal image; controlling the shutter to be opened; capturing a second thermal image; applying the correction offset value to the second thermal image; measuring a sound with a microphone when controlling the shutter to be closed and/or when controlling the shutter to be opened; determining whether the measured sound matches an operation sound of the shutter; and outputting an alarm indicating malfunction of the shutter if the measured sound does not match the operation sound.

The shutter operation state monitoring method further includes, removing a common sound corresponding to noise from the measured sound.

The operation sound is a reference sound stored in advance for the shutter, and an operation sound of the shutter being opened is distinguished from an operation sound of the shutter being closed.

The shutter operation state monitoring method further includes, if the measured sound does not match the operation sound, displaying a state of the malfunction of the shutter by distinguishing whether the malfunction of the shutter includes a malfunction in an open state or in a closed state of the shutter.

The shutter operation state monitoring method further includes, applying a previous correction offset value before the malfunction of the shutter to a current thermal image if a determination is made that the malfunction of the shutter includes a malfunction in an open state of the shutter.

The calculating the correction offset value includes calculating individual correction offset values for pixels included in the first thermal image, the applying the correction offset value includes applying the individual correction offset values to pixels included in the second thermal image, and positions of the pixels included in the second thermal image correspond to positions of the pixels included in the first thermal image.

According to another aspect of the present disclosure, there is provided a shutter operation state monitoring method performed in a thermal imaging camera, which includes a processor and a memory storing instructions that can be executed by the processor, by the instructions under the control of the processor, the shutter operating state monitoring method including: measuring a sound with a microphone while controlling the opening and the closing of a shutter of the thermal imaging camera; determining whether malfunction of the shutter has occurred by determining whether the measured sound matches an operation sound of the shutter; estimating a correction offset value with reference to a mapping table stored in a storage if a determination is made that the malfunction of the shutter has occurred; and correcting a captured thermal image with the estimated correction offset value.

The determining whether the malfunction of the shutter has occurred, includes determining that the malfunction of the shutter has occurred, if a difference between characteristic values of the measured sound and the operation sound exceeds a reference value.

Each of the characteristic values includes at least one of level and frequency.

The determining whether the malfunction of the shutter has occurred, further includes determining that the malfunction of the shutter has occurred, if a difference between levels of the measured sound and the operation sound exceeds a first reference value and a difference between frequencies of the measured sound and the operation sound exceeds a second reference value.

The mapping table includes data pairs including temperature measurements provided by a temperature sensor and correction offset values paired one-to-one with the temperature measurements.

The estimating the correction offset value with reference to the mapping table, includes, if a correction offset value for a particular temperature does not exist in the mapping table, estimating the correction offset value for the particular temperature by performing interpolation based on the data pairs included in the mapping table.

The mapping table is generated by a pre-calibration process and is stored in the storage before shipment of the thermal imaging camera.

The estimating the correction offset value with reference to the mapping table, includes estimating the correction offset value with reference to the mapping table only if a temperature measured by the temperature sensor satisfies a temperature variation condition, and the temperature variation condition is whether the measured temperature accounts for a larger fluctuation from an existing temperature than a reference value.

The temperature variation condition is checked at intervals of a predetermined period.

The shutter operation state monitoring method further includes, if a determination is made that the malfunction of the shutter has not occurred, calculating a correction offset value through the opening and the closing of the shutter and storing the calculated correction offset value in the mapping table.

The storing the calculated correction offset value in the mapping table, includes storing the calculated correction offset value in the mapping table at intervals of a correction period, the correction period is applied differently to a first period, which is a period from the thermal imaging camera being powered on to a thermal imaging sensor being stabilized, in comparison to a second period, which is a period after the thermal imaging sensor reaches a stable state.

The correction period is shorter for the first period than for the second period.

The malfunction of the shutter includes a malfunction in which the shutter remains closed without being able to be open, the estimating the correction offset value with reference to the mapping table, includes resetting the thermal imaging camera, controlling the shutter to remain open, measuring a temperature with a temperature sensor, and estimating the correction offset value with reference to the mapping table only if the measured temperature satisfies a temperature variation condition, and the temperature variation condition is whether the measured temperature accounts for a larger fluctuation from an existing temperature than a reference value.

The temperature variation condition is checked at intervals of a predetermined period.

According to the aforementioned and other examples of the present disclosure, a shutter malfunction of a thermal imaging camera can be accurately detected using the operation sound of a mechanical shutter of the thermal imaging camera.

Also, a malfunction in which the mechanical shutter remains open and a malfunction in which the mechanical shutter remains closed can be handled differently.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail examples thereof with reference to the attached drawings, in which:

FIG. 5 is a graph showing

DETAILED DESCRIPTION

Advantages and features of the disclosure and methods to achieve them will become apparent from the descriptions of examples herein below with reference to the accompanying drawings. However, the inventive concept is not limited to examples disclosed herein but may be implemented in various ways. The examples are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the examples rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, examples of the present disclosure will be described in detail with reference to the accompanying drawings.

Figure 1:
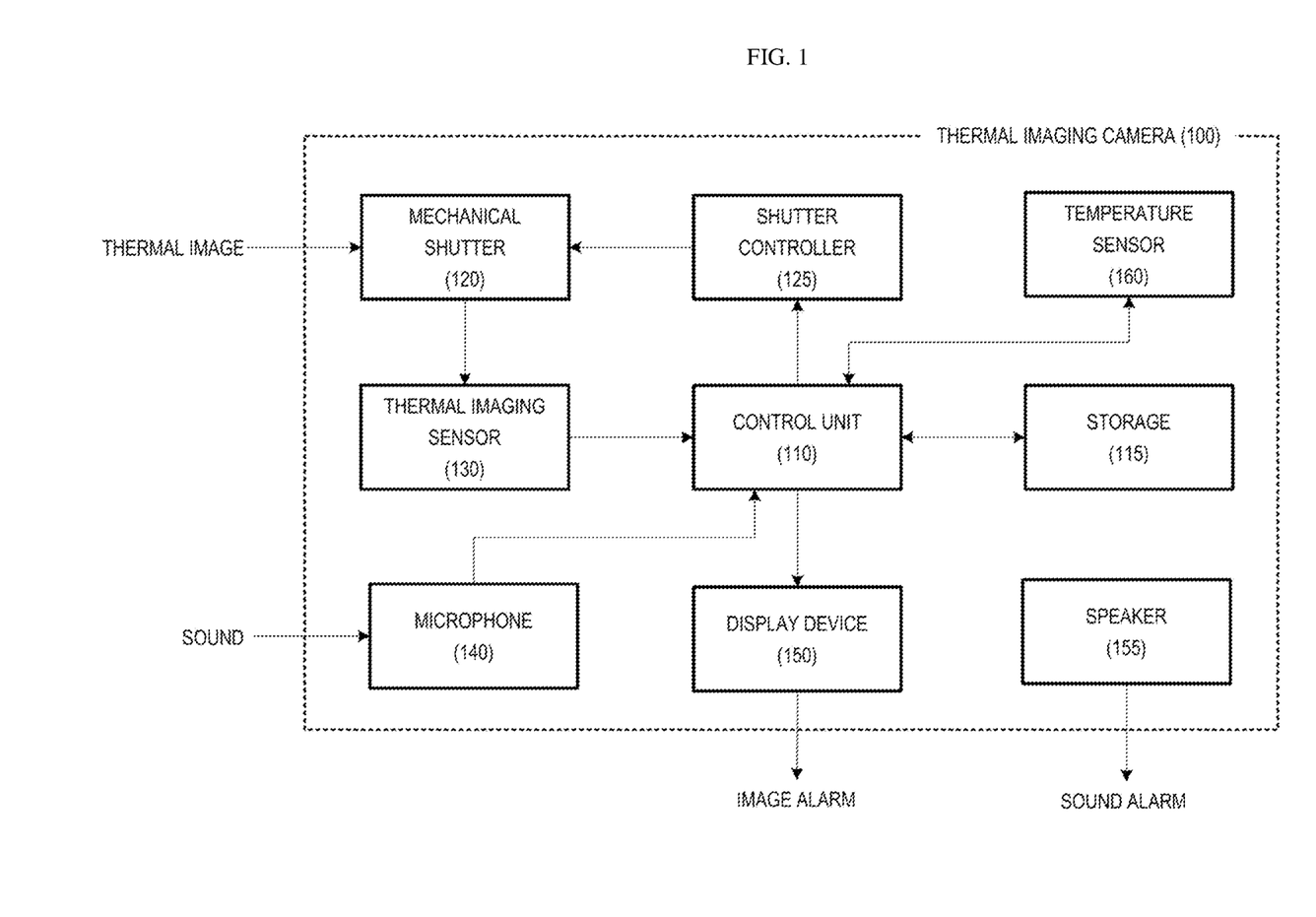
FIG. 1 is a block diagram of a thermal imaging camera according to the present disclosure.

FIG. 1 is a block diagram of a thermal imaging camera according to the present disclosure. Referring to FIG. 1, a thermal imaging camera 100 may be configured to include a control unit 110, a storage 115, a mechanical shutter 120, a shutter controller 125, a thermal imaging sensor 130, a microphone 140, a display device 150, a speaker 155, and a temperature sensor 160.

The control unit 110, which functions as a controller for controlling the operations of the other elements of the thermal imaging camera 100, may be implemented as a central processing unit or a microprocessor. The storage 115, which is a storage medium for storing result data provided by the control unit 110 or data necessary for the operation of the control unit 110, may be implemented as a volatile memory or a nonvolatile memory.

The mechanical shutter 120, which is a physical shutter that consists of a single blade or multiple blades, generates a unique sound while being opened or closed. The mechanical shutter 120 may be opened or closed by the shutter controller 125. The shutter controller 125 may be implemented as a rotary motor, a linear motor, or an actuator.

The thermal imaging sensor 130 senses a thermal image input to the thermal imaging camera 100 with the mechanical shutter 120 opened or closed and outputs the thermal image as data. The thermal imaging sensor 130 generates an image using infrared light, rather than visible light. For example, the thermal imaging sensor 130 may receive infrared energy and may generate an image via a digital or analog image output function by using data of the infrared energy.

However, if a change in the surroundings that can result in a temperature change of the thermal imaging sensor 130 occurs, correction is needed to obtain an optical image. The change in the surroundings is detected by using temperature measurements from a temperature sensor integrated in the thermal imaging sensor 130, a temperature sensor for measuring the temperature of the thermal imaging sensor 130, a temperature sensor for measuring the temperature of the mechanical shutter 120, and a temperature sensor for measuring the temperature of the surroundings of a lens. The mechanical shutter 120, which operates in front of the thermal imaging camera 100 may be used to correct the thermal imaging sensor 130.

To correct the thermal imaging sensor 130, a thermal image is captured with the mechanical shutter 120 closed. Thereafter, the control unit 110 calculates individual correction offset values for the pixels of the thermal imaging sensor 130, based on image data of the thermal image. Once the calculation of the individual correction offset values is complete, the mechanical shutter 120 is opened again, and a clear thermal image can be obtained using the individual correction offset values.

The microphone 140, which is a device for converting an external sound wave signal into an electrical signal, receives an operating sound of the mechanical shutter 120 when the mechanical shutter 120 is operating, i.e., when the mechanical shutter 120 is being switched to an open state and/or a closed state.

The display device 150, which is a device capable of providing an image to a user, such as a liquid crystal display (LCD) or a light-emitting diode (LED) display, may display an image alarm under the control of the control unit 110. The speaker 155, which is a device for converting an electrical signal into sound waves via vibration, may output a sound alarm under the control of the control unit 110.

Operations that are performed cooperatively by the elements of the thermal imaging camera 100 will hereinafter be described.

First, the control unit 110 controls the mechanical shutter 120 to be closed with the use of a control signal for the shutter controller 125. Then, the thermal imaging camera 100 captures a first thermal image with the thermal imaging sensor 130 with the mechanical shutter 120 closed.

Thereafter, the control unit 110 calculates a correction offset value for the first thermal image. Specifically, the control unit 110 calculates individual correction offset values for the pixels included in the first thermal image. For example, the individual correction offset values may be stored in the storage 115 as an array for the positions of the pixels of the first thermal image.

Thereafter, the control unit 110 controls the mechanical shutter 120 to be opened via the shutter controller 125 and a second thermal image with the thermal imaging sensor 130. Then, the control unit 110 obtains a clear thermal image by applying the calculated correction offset value to the second thermal image. Specifically, the control unit 110 applies the individual correction offset values to their respective pixels of the second thermal image. The control unit 110 may apply the individual correction offset values such that the positions of the pixels of the first thermal image may correspond to the positions of the pixels of the first thermal image.

The mechanical shutter 120 generates a unique sound according to its unique characteristics. The unique sound of the mechanical shutter 120 may be obtained and stored in advance in the storage 115 as a reference sound. For example, if the operating sound of the mechanical shutter 120 of the mechanical shutter 120 being opened is distinctly different from the operating sound of the mechanical shutter 120 of the mechanical shutter 120 being closed, the operating sound of the mechanical shutter 120 of the mechanical shutter 120 being opened and the operating sound of the mechanical shutter 120 of the mechanical shutter 120 being closed may be stored separately, but the present disclosure is not limited thereto. Alternatively, if the operating sound of the mechanical shutter 120 of the mechanical shutter 120 being opened and the operating sound of the mechanical shutter 120 of the mechanical shutter 120 being closed are not substantially different, they may be stored as a single operating source.

The microphone 140 is a device for measuring a sound at at least one point of time between the mechanical shutter 120 being closed and the mechanical shutter 120 being opened. Preferably, the microphone 140 may measure a sound for a predetermined period of time including before and after the generation of a control signal for switching the mechanical shutter 120 to an open state or a closed state and may provide the result of the measurement to the control unit 110. As the operation of the mechanical shutter 120 is controlled by the control unit 110 based on input signals from various sensors and the temperature of the surroundings of the sensors, the control unit 110 may determine the operation timing of the mechanical shutter 120 and the input timing of the microphone 140.

The control unit 110 may determine whether the sound measured by the microphone 140 matches the operating sound stored in the storage 115, i.e., the reference sound. The control unit 110 may prevent error by removing a common sound corresponding to noise from the sound measured by the microphone 140.

If the sound measured by the microphone 140 does not match the reference sound or no shutter sound is generated, the control unit 110 outputs an alarm indicating malfunction of the mechanical shutter 120. Specifically, the control unit 110 may output the alarm as an image via the display device 150 or as a sound via the speaker 155. Alternatively, the control unit 110 may output the alarm to a user at a remote location via a network as a message.

If the sound measured by the microphone 140 matches the reference sound (or if a shutter sound is properly generated), malfunction of the mechanical shutter 120 is detected for a subsequent correction process for the thermal imaging sensor 130.

If the sound measured by the microphone 140 does not match the reference sound, the control unit 110 may provide an indication of the malfunction of the mechanical shutter 120 with or without distinguishing whether the malfunction of the mechanical shutter 120 is a malfunction in the open state or in the closed state of the mechanical shutter 120.

In a case where the mechanical shutter 120 malfunctions in its open state, it is almost impossible to calculate an up-to-date correction offset value for a current thermal image. Thus, the control unit 110 may correct the current thermal image by applying a previous correction offset value before the malfunction of the mechanical shutter 120 to the current thermal image as a temporary measure.

The temperature sensor 160 detects the temperature at a particular location and may be implemented as a thermocouple, a resistance temperature detector, or a thermistor. The temperature sensor 160 may be installed in the thermal imaging sensor 130 and/or near the mechanical shutter 120.

To deal with a future malfunction of the mechanical shutter 120, the control unit 110 may measure a correction offset value in advance at intervals of a correction period and may store the measured correction offset value in the storage 115 in a mapping table. The correction period may vary depending on whether the temperature detected by the temperature sensor 160 is stable (or normal). For example, the control unit 110 may measure a correction offset value at intervals of a short period of time (of, for example, 20 seconds, 40 seconds, or 1 minute) until the temperature detected by the temperature sensor 160 is stabilized, and at intervals of a longer period of time (of, for example, 4.5 minutes or 10 minutes) after the temperature detected by the temperature sensor 160 is stabilized.

Data pairs including temperatures and correction offset values paired one-to-one with the temperatures may be stored in the mapping table. The mapping table does not provide correction offset values for all temperatures, and the control unit 110 can calculate correction offset values for in-between temperatures by using various interpolation methods. The interpolation methods include linear interpolation, nearest interpolation, bi-cubic interpolation, and area interpolation.

The mapping table may be generated by measuring correction offset values with the control unit 110 when the mechanical shutter 120 operates normally, but the present disclosure is not limited thereto. Alternatively, the mapping table may be generated and stored in advance in the storage 115 by a pre-calibration process before shipment of the thermal imaging camera 100.

Figure 2:
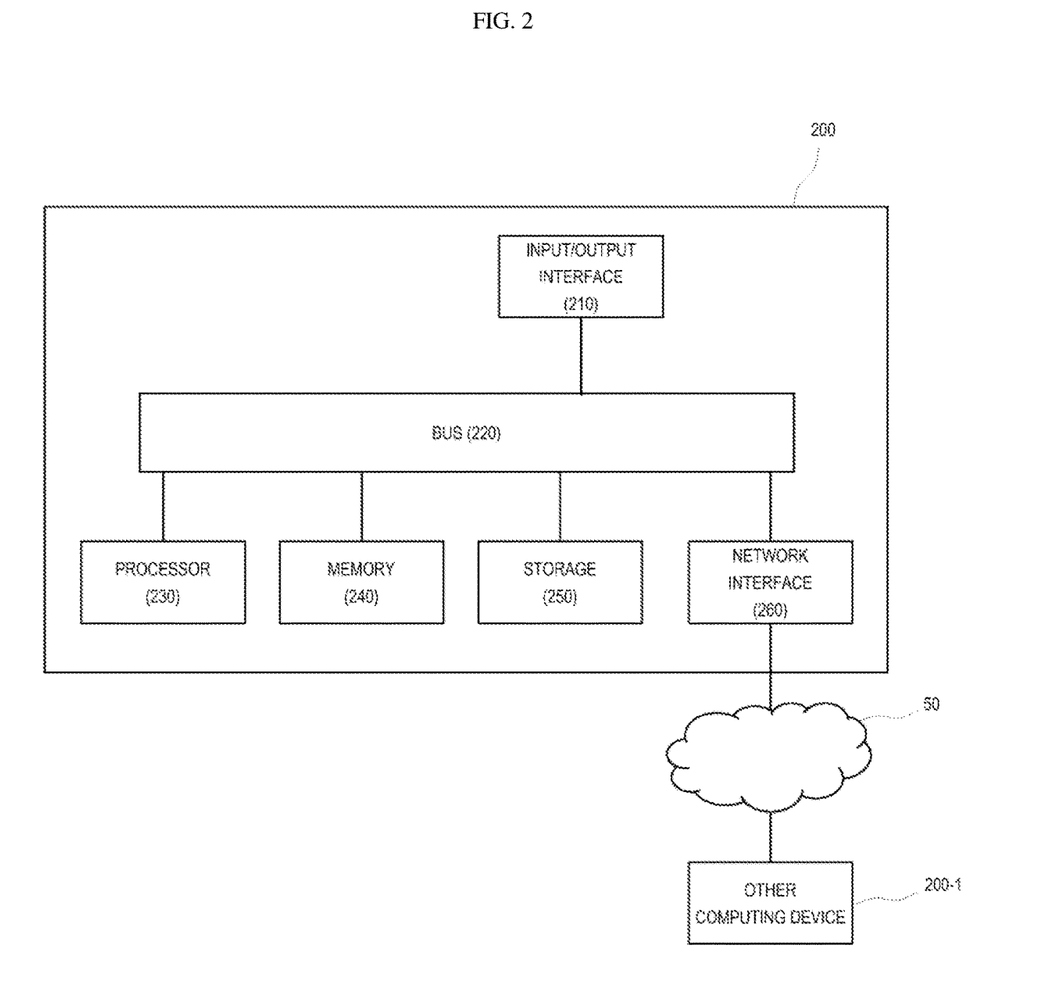
FIG. 2 is a block diagram illustrating the hardware configuration of a computing device that implements a thermal imaging camera.

FIG. 2 is a block diagram illustrating the hardware configuration of a computing device that implements a thermal imaging camera.

Referring to FIG. 2, a computing device 200 includes a bus 220, a processor 230, a memory 240, a storage 250, an input/output interface 210, and a network interface 260. The bus 220 is a path for the transmission of data between the processor 230, the memory 240, the storage 250, the input/output interface 210, and the network interface 260. However, how the processor 230, the memory 240, the storage 250, the input/output interface 210, and the network interface 260 are connected is not particularly limited. The processor 230 is an arithmetic processing unit such as a central processing unit (CPU) or a graphics processing unit (GPU). The memory 240 is a memory such as a random-access memory (RAM) or a read-only memory (ROM). The storage 250 is a storage device such as a hard disk, a solid state drive (SSD), or a memory card. The storage 250 may also be a memory such as a RAM or a ROM.

The input/output interface 210 is an interface for connecting the computing device 200 and an input/output device. For example, a keyboard or a mouse is connected to the input/output interface 210.

The network interface 260 is an interface for communicatively connecting the computing device 200 and an external device to exchange transport packets with each other. The network interface 260 may be a network interface for connection to a wired line or for connection to a wireless line. For example, the computing device 200 may be connected to another computing device 200-1 via a network 50.

The storage 250 stores program modules that implement the functions of the computing device 200. The processor 230 implements the functions of the computing device 200 by executing the program modules. Here, the processor 230 may read the program modules into the memory 240 and may then execute the program modules.

The hardware configuration of the computing device 200 is not particularly limited. For example, the program modules may be stored in the memory 240. In this example, the computing device 200 may not include the storage 250.

The thermal imaging camera 100 may at least include the processor 230 and the memory 240, which stores instructions that can be executed by the processor 230. The thermal imaging camera 100 of FIG. 1, in particular, is driven by executing instructions including a variety of functional blocks or steps included in the thermal imaging camera 100, via the processor 230.

Figure 3:
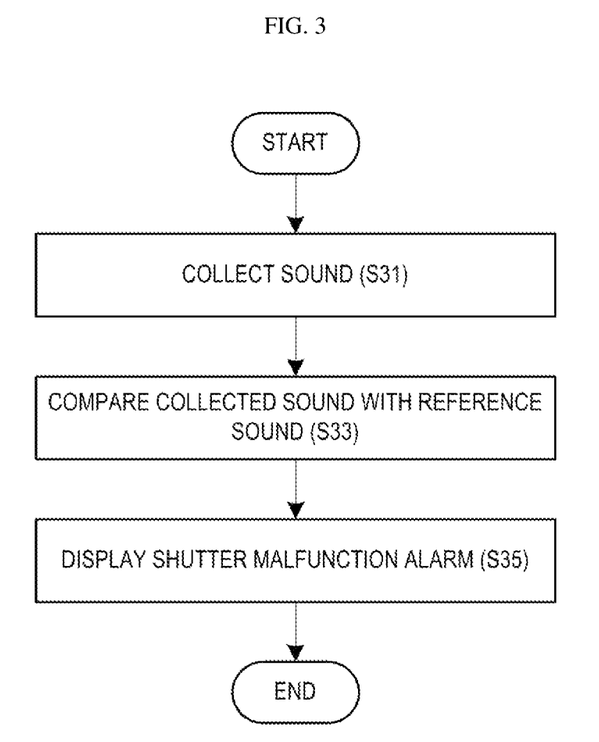
FIG. 3 is a flowchart illustrating a method of detecting malfunction of a shutter of a thermal imaging camera according to the present disclosure.

FIG. 3 is a flowchart illustrating a method of detecting a shutter malfunction of the thermal imaging camera 100 according to the present disclosure.

Referring to FIG. 3, when the mechanical shutter 120 operates for the correction of the thermal imaging sensor 130, the control unit 110 collects an external sound, with the microphone 140, before and after the operation of the mechanical shutter 120 (S31). To improve accuracy, the control unit 110 may remove a common sound considered noise from the externa sound.

Thereafter, the control unit 110 compares the collected external sound with the operating sound stored in the storage 115, i.e., the reference sound (S33). If the degree of similarity between the external sound and the reference sound is greater than a predetermined threshold value, the control unit 110 determines that the mechanical shutter 120 is being properly opened or closed. On the contrary, if the degree of similarity between the external sound and the reference sound is less than the predetermined threshold value, the control unit 110 provides an indication of malfunction of the mechanical shutter 120 (S35).

The method of FIG. 3 will hereinafter be described in further detail with reference to FIG. 4.

Figure 4:
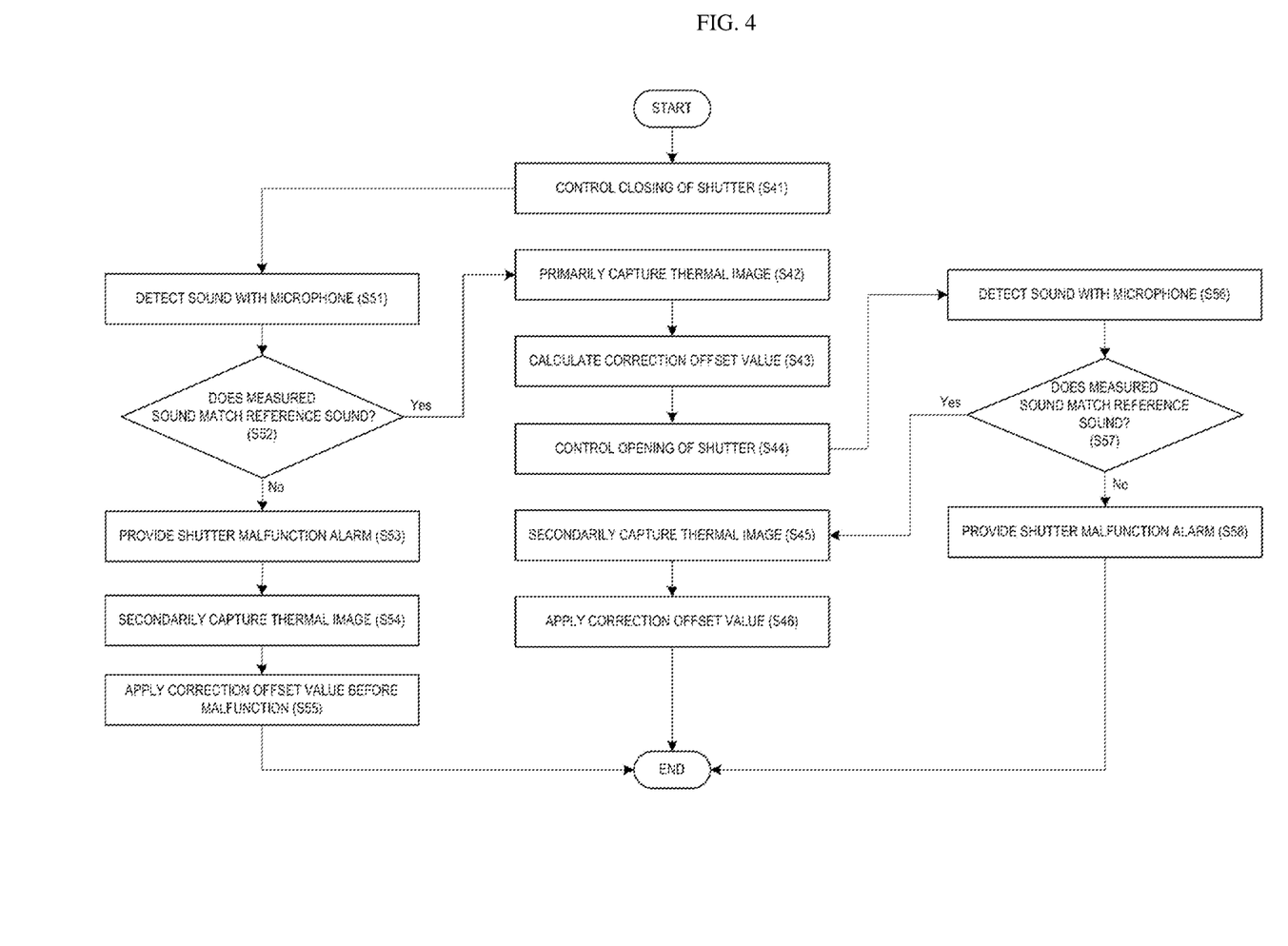
FIG. 4 is a detailed flowchart illustrating the method of FIG. 3.

Referring to FIG. 4, the control unit 110 controls the mechanical shutter 120 to be closed with a control signal for the shutter controller 125 (S41). Thereafter, the thermal imaging sensor 130 captures a first thermal image with the mechanical shutter 120 closed (S42).

Thereafter, the control unit 110 calculates a correction offset value for the thermal image captured in S42 (S43). Specifically, the control unit 110 calculates individual correction offset values for pixels included in the thermal image captured in S42. For example, the individual correction offset values may be stored in the storage 115 as an array for the positions of the pixels.

Thereafter, the control unit 110 controls the mechanical shutter 120 to be opened via the shutter controller 125 (S44) and captures a second thermal image with the thermal imaging sensor 130 (S45). The control unit 110 obtains a corrected clear thermal image by the individual correction offset values to their respective pixels of the thermal image captured in S45 (S46).

The microphone 140 measures a sound for a predetermined period of time including before and after the switching of the mechanical shutter 120 to an open/closed state (S51 or S56). The control unit 110 determines whether the measured sound matches the operating sound stored in the storage 115, i.e., the reference sound (S52 or S57). The control unit 110 may determine whether the measured sound matches the reference sound by determining whether the degree of similarity (or correlation) between the measured sound and the reference sound exceeds a predetermined threshold value, i.e., whether the difference between the characteristic values of the measured sound and the reference sound is less than a predetermined reference value. If a determination is made that the measured sound matches the reference sound, the method returns to S42 or S45.

Figure 5:
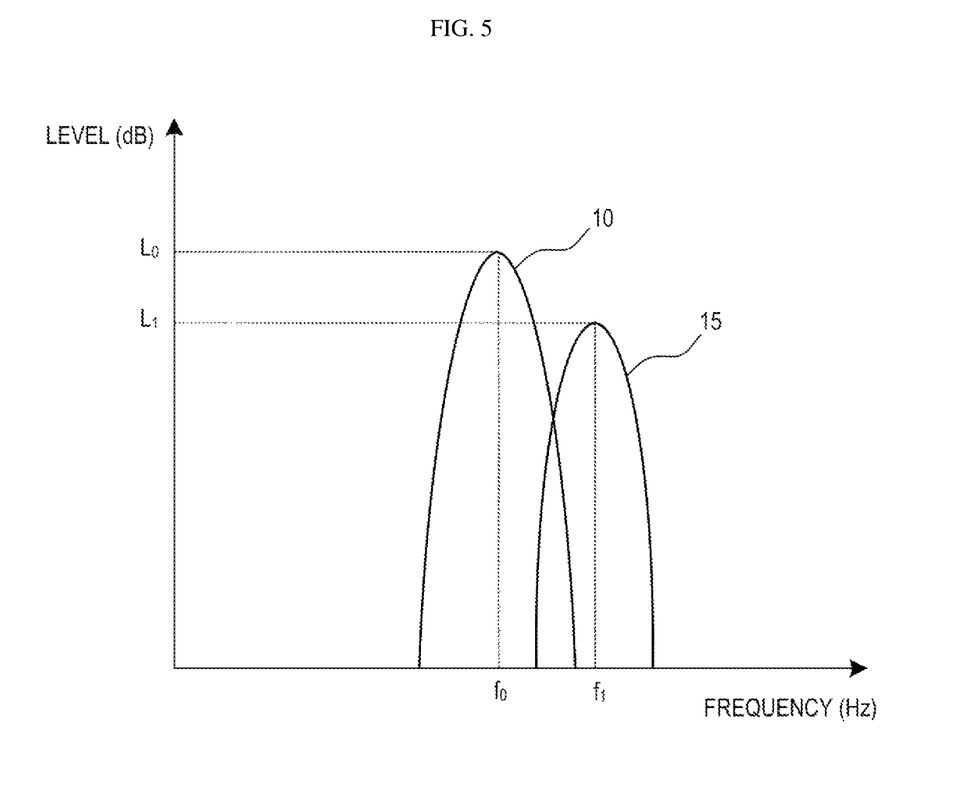

Specifically, the control unit 110 may determine whether the measured sound matches the reference sound by comparing the frequency (in Hz) and/or level (in dB) of the measured sound with the frequency (in Hz) and/or level (in dB) of the reference sound. FIG. 5 is a graph comparing the central frequency and level of a sound 15 measured by the microphone 14 with the central frequency and level of a reference sound 10. Referring to FIG. 5, a frequency $f_1$ of the measured sound 15 is higher than a frequency $f_0$ of the reference sound 10, and a level $L_1$ of the measured sound 15 is higher than a level $L_0$ of the reference sound 10.

For example, the control unit 110 may determine that the measured sound does not match the reference sound, i.e., malfunction of the mechanical shutter 120 has occurred, if the difference between the frequencies of the measured sound and the reference sound exceeds a first reference value and the difference between the levels of the measured sound and the reference sound exceeds a second reference value. If there is only a similarity between the frequencies of the measured sound and the reference sound or between the levels of the measured sound and the reference sound, the measured sound may be determined as having originated from external noise, rather than from the operation of the mechanical shutter 120.

If a determination is made that the measured sound does not match the reference sound, the control unit 110 outputs a malfunction alarm (S53 or S58). After S53, the thermal imaging sensor 130 captures a second thermal image (S54), and the control unit 110 applies one of the correction offset values present in the storage 115 to the thermal image captured in S54 (S55).

FIG. 4 illustrates that malfunction of the mechanical shutter 120 is detected during both the closing and the opening of the mechanical shutter 120, but alternatively, malfunction of the mechanical shutter 120 may be detected during only the closing or the opening of the mechanical shutter 120.

According to the flowchart of FIG. 4, malfunction of the mechanical shutter 120 is detected based on whether the measured sound matches the reference sound, and then, a shutter malfunction alarm is provided to the user. On the contrary, the flowchart of FIG. 6 provides a shutter operation state monitoring method capable of not only detecting malfunction of the mechanical shutter 120, but also temporarily handling a case where malfunction of the mechanical shutter 120 has occurred.

Figure 6:
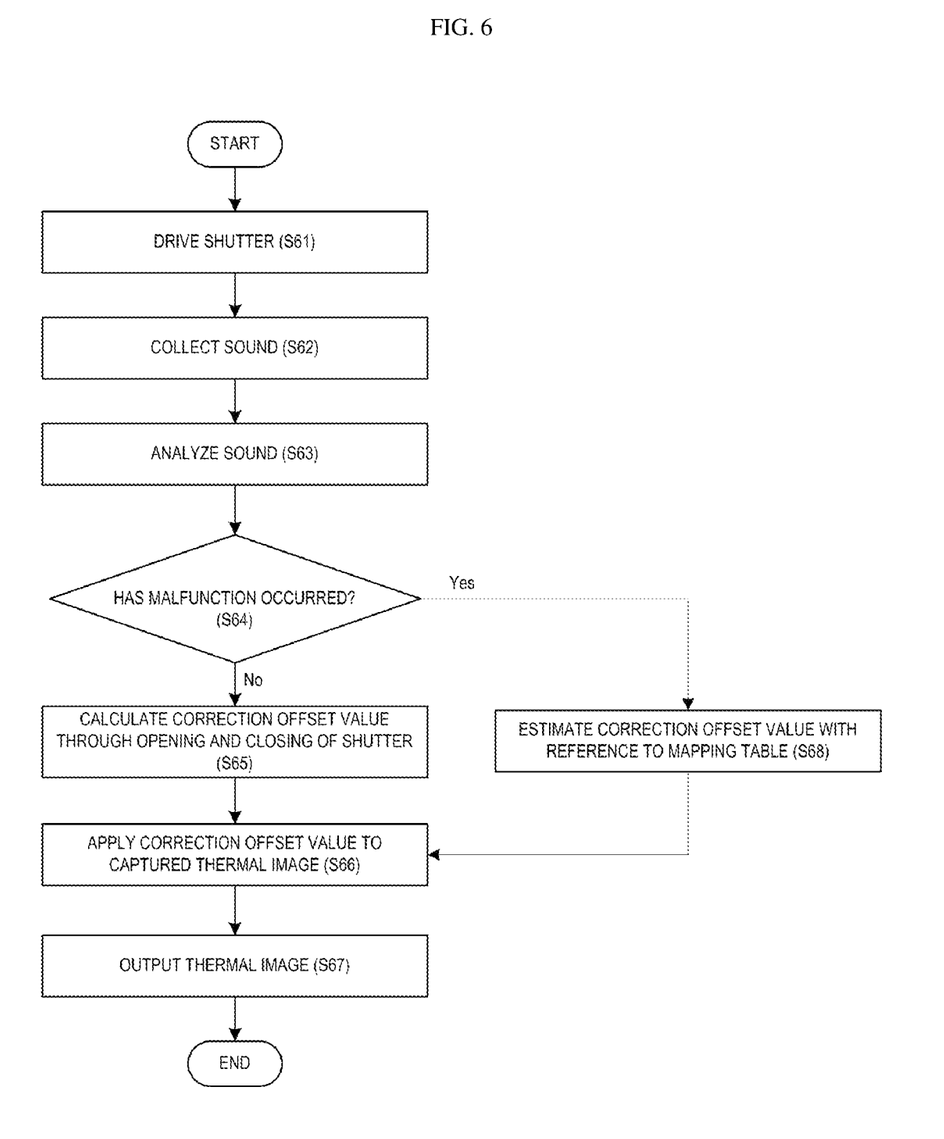
FIG. 6 is a flowchart illustrating a shutter operation state monitoring method capable of temporarily handling even a case where malfunction of a mechanical shutter has occurred.

Referring to FIG. 6, the control unit 110 performs the opening and the closing of the mechanical shutter 120 (S61). The microphone 140 collects a sound for a period of time including before and after the switching of the mechanical shutter 120 to an open/closed state (S62). The control unit 110 analyzes the characteristic value (e.g., the level, central frequency, and/or bandwidth) of the collected sound (S63). Then, the control unit 110 may determine whether malfunction of the mechanical shutter 120 has occurred (S64). For example, if the difference between the characteristic value of the collected sound and the characteristic value of the reference sound (or the operating sound) exceeds a predetermined reference value, the control unit 110 may determine that malfunction of the mechanical shutter 120 has occurred.

If the result of the determination indicates that malfunction of the mechanical shutter 120 has occurred ("Yes" in S64), the shutter operation state monitoring method proceeds to S68. If the result of the analysis indicates that malfunction of the mechanical shutter 120 has not occurred ("No" in S64), the shutter operation state monitoring method proceeds to S65. The detection of malfunction of the mechanical shutter 120 in S64 has already been described above with reference to FIG. 4, and thus, a detailed description thereof will be omitted.

If a determination is made that malfunction of the mechanical shutter 120 has not occurred ("No" in S64), the control unit 110 calculates a correction offset value through the opening and closing of the mechanical shutter 120 (S65). S65 is similar to its counterpart of FIG. 4.

Specifically, the control unit 110 closes the mechanical shutter 120 with a control signal for the shutter controller 125, captures a first thermal image with the thermal imaging sensor 130, and calculates a correction offset value for the first thermal image.

Thereafter, the control unit 110 opens the mechanical shutter 120 with a control signal for the shutter controller 125 and applies the calculated correction offset value to a thermal image currently being captured by the thermal imaging camera 100 (or a thermal image secondarily captured by the thermal imaging camera 100) (S66). To obtain a clear thermal image, the control unit 110 corrects the current thermal image or the second thermal image by applying individual correction offset values for individual pixels of the current thermal image or the second thermal image.

Thereafter, the corrected thermal image may be stored in the storage 115 or may be output (S67) by being transmitted over a network or being displayed to the user via the display device 150.

On the contrary, if a determination is made that malfunction of the mechanical shutter 120 has occurred ("Yes" in S64), the control unit 110 estimates (or interpolates) a correction offset value with reference to a mapping table stored in advance in the storage 115 (S68) because the mechanical shutter 120 may not be able to be properly opened or closed.

As already mentioned above, the mapping table may be generated by the control unit 110 and may then be stored in the storage 115 when the mechanical shutter 120 operates normally. Alternatively, the mapping table may be generated by a pre-calibration process before shipment of the thermal imaging camera 100 and may then be stored in advance in the storage 115.

Figure 7:
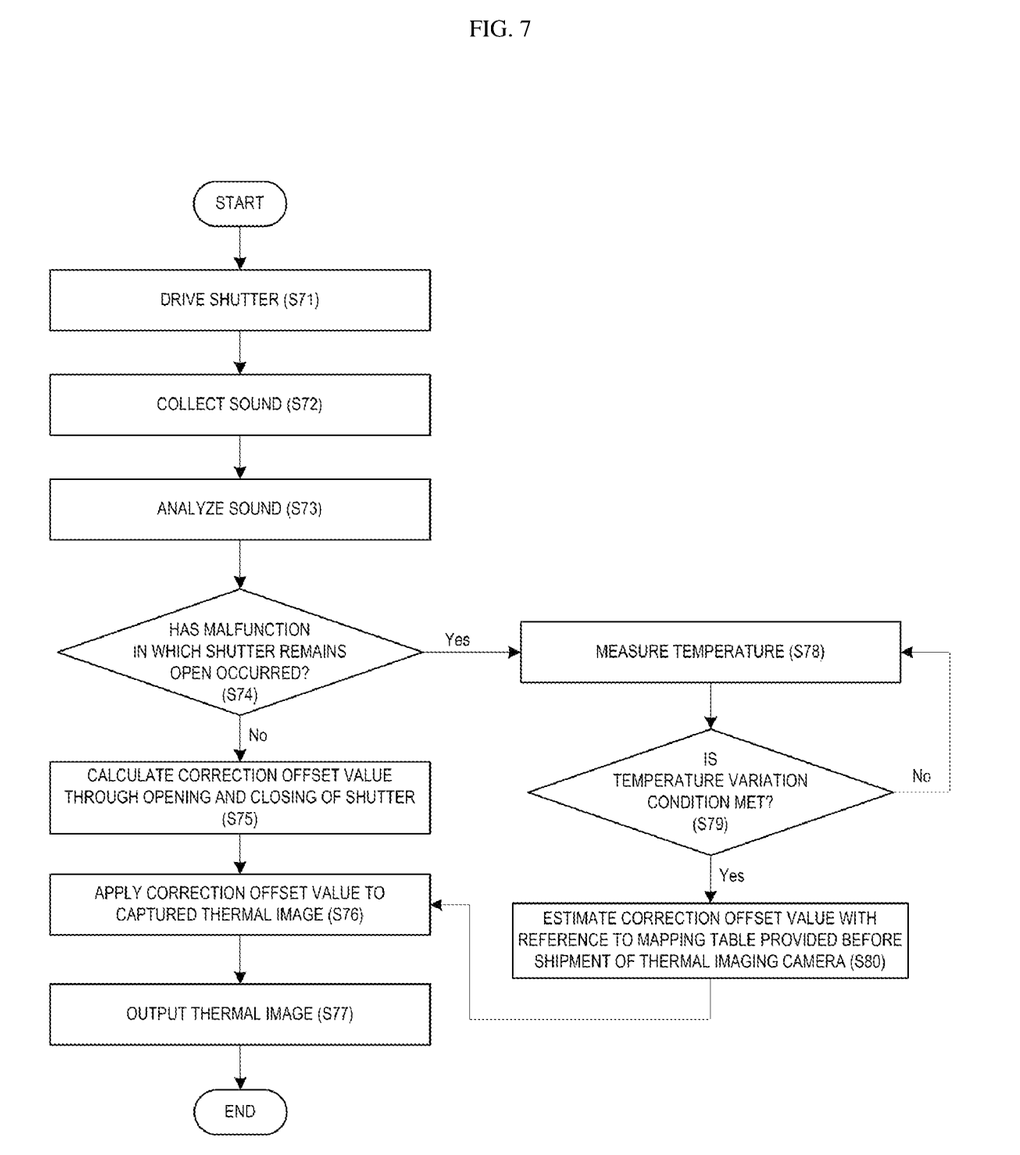
FIG. 7 is a flowchart illustrating a shutter operation state monitoring method in a case where a mapping table is generated in advance before shipment of a thermal imaging camera.
Figure 8:
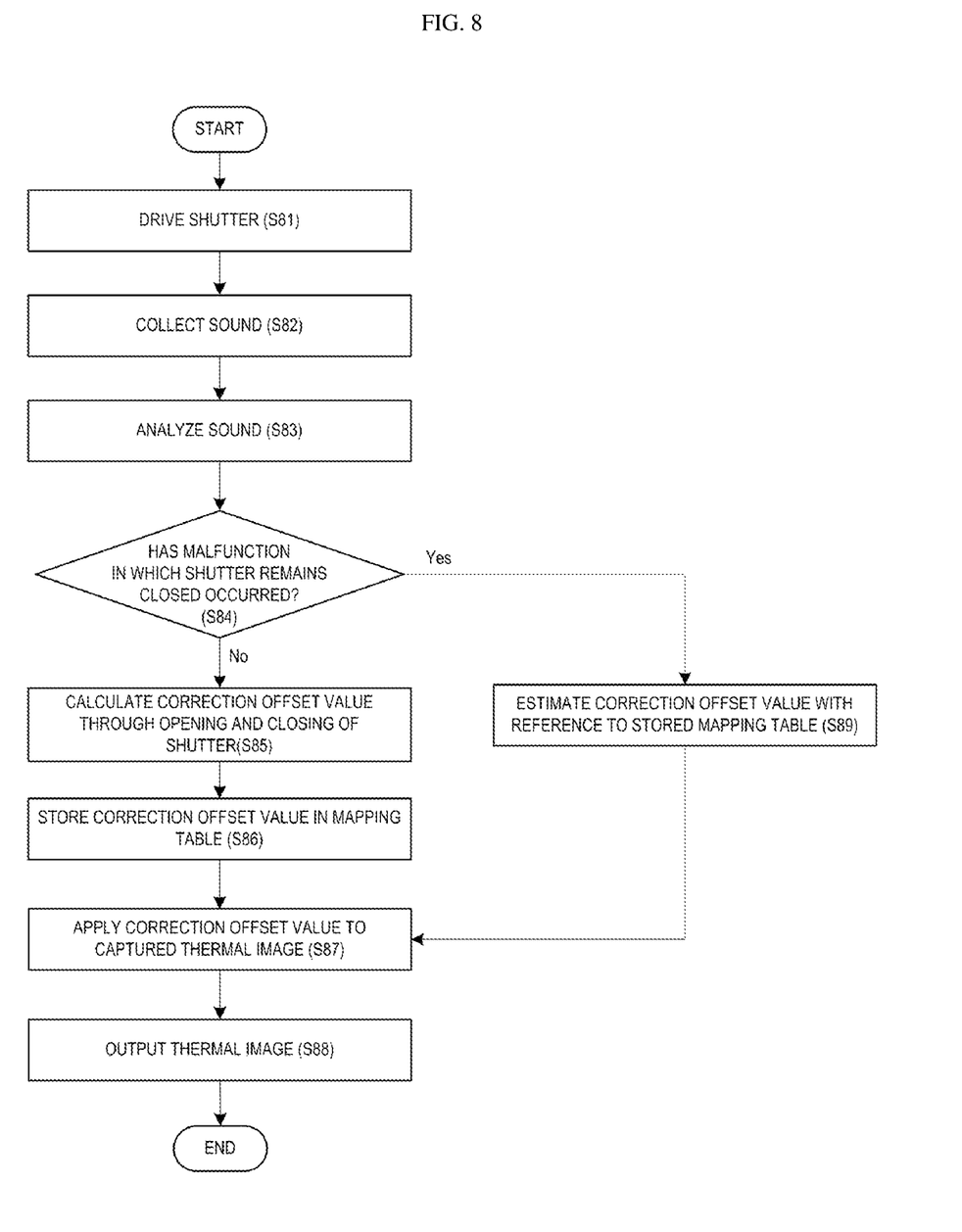
FIG. 8 is a flowchart illustrating a shutter operation state monitoring method in a case where a mapping table is generated by a control unit of a thermal imaging camera.

Specifically, FIG. 7 illustrates a shutter operation state monitoring method in a case where the mapping table is generated in advance before shipment of the thermal imaging camera 100, and FIG. 8 illustrates a shutter operation state monitoring method in a case where the mapping table is generated by the control unit 110.

Referring to FIG. 7, the reference to S71, S72, and S73 are the same as their respective counterparts of FIG. 6, and thus, detailed descriptions thereof will be omitted.

The control unit 110 determines whether malfunction of the mechanical shutter 120 has occurred (S74). Here, malfunction of the mechanical shutter 120 may refer to a case where the mechanical shutter 120 remains closed without being able to be open.

If a determination is made that malfunction of the mechanical shutter 120 has not occurred ("No" in S74), S75, S76, and S77, which are the same as S65, S66, and S67, respectively, of FIG. 6, are performed.

On the contrary, if a determination is made that malfunction of the mechanical shutter 120 has occurred ("Yes" in S74), the control unit 110 measures the temperature of the thermal imaging sensor 130 or the mechanical shutter 120 with the temperature sensor 160 (S78) and determines whether the measured temperature satisfies a temperature variation condition (S79).

Here, the temperature variation condition refers to a case where the temperature of the thermal imaging camera 100 has varied by more than a predetermined amount (of, for example, 0.5° or greater), and the temperature of the thermal imaging camera 100 may be checked at intervals of a predetermined period (for example, every 4.5 minutes). Existing correction offset values may not be modified, but may be used as they are, if the temperature of the thermal imaging camera 100 has varied by more than the predetermined amount, but the predetermined period has not yet arrived, or if the predetermined period has arrived, but the temperature of the thermal imaging camera 100 has varied by less than the predetermined amount.

If a determination is made that the temperature variation condition is met ("Yes" in S79), the existing correction offset values are considered unreliable, and thus, the control unit 110 estimates (or interpolates) a correction offset value with reference to the mapping table stored in advance in the storage 115 before shipment of the thermal imaging camera 100 (S80).

The estimated correction offset value is applied to a current thermal image (S76), and a corrected thermal image obtained by S76 is finally output (S77).

FIG. 8 is a flowchart illustrating a shutter operation state monitoring method in a case where the mapping table is generated by the control unit 110.

Referring to FIG. 8, the references to S81, S82, S83, S84, S85, S87, and S88 are the same as their respective counterparts of FIG. 7, and thus, descriptions thereof will be omitted.

FIG. 8 presents a shutter operation state monitoring method in a case where a mapping table is generated by the control unit 110 when the mechanical shutter 120 operates normally, and the shutter operation state monitoring method of FIG. 8 further includes recording a correction offset value obtained in S85 in the mapping table present in the storage 115 (S86).

That is, the control unit 110 may add the calculated correction offset value to the mapping table present in the storage 115 at intervals of a correction period. The more correction offset values are added to the mapping table, the more accurately the estimation (or interpolation) of a correction offset value can be performed in case of emergency.

The correction period may be applied differently to a first period, which is the period from the thermal imaging camera 100 being powered on to the thermal imaging sensor 130 being stabilized, in comparison to a second period, which is the period after the thermal imaging sensor 130 reaches a stable (or normal) state.

For example, a relatively short correction period (of, for example, 20 seconds, 40 seconds, or 1 minute) may be applied to the first period when the thermal imaging sensor 130 is yet to be stabilized, and a longer correction period (of, for example, 4.5 minutes or 10 minutes) may be applied to the second period when the thermal imaging sensor 130 is stable.

If a determination is made in S84 that malfunction of the mechanical shutter 120 has occurred, the control unit 110 estimates (or interpolates) a correction offset value with reference to the mapping table present in the storage 115 (S89). The estimated (or interpolated) correction offset value is applied to a current thermal image (S87), and a corrected thermal image obtained by S87 is finally output (S88).

Figure 9:
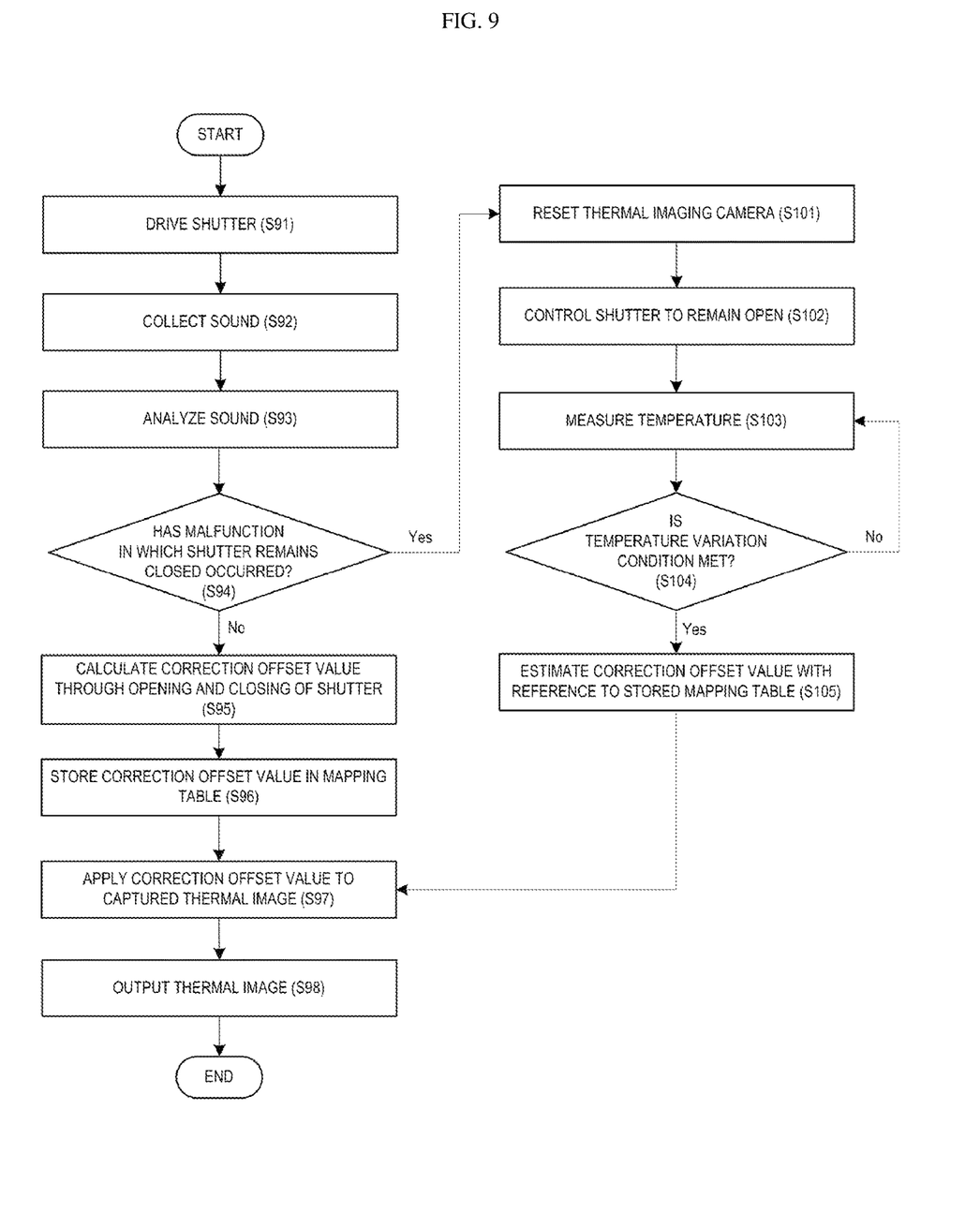
FIG. 9 is a flowchart illustrating a shutter operation state monitoring method capable of temporarily handling even a case where a mechanical shutter remains closed without being able to be open.

Meanwhile, malfunction of the mechanical shutter 120 includes a case where the mechanical shutter 120 remains open without being able to be closed, as described above with reference to FIGS. 7 and 8, and a case where the mechanical shutter 120 remains closed without being able to be open. FIG. 9 presents a shutter operation state monitoring method capable of temporarily handling even the case where the mechanical shutter 120 remains closed.

Referring to FIG. 9, the references to S91, S92, S93, S95, S96, S97, and S98 are the same as their respective counterparts of FIG. 8, and descriptions thereof will be omitted.

A determination is made as to whether a malfunction in which the mechanical shutter 120 remains closed has occurred (S94). If a determination is made that the malfunction in which the mechanical shutter 120 remains closed has not occurred ("No" in S94), the shutter operation state monitoring method proceeds to S95 so that S95, S96, S97, and S98 are performed normally.

On the contrary, if a determination is made that the malfunction in which the mechanical shutter 120 remains closed has occurred ("Yes" in S94), the control unit 110 completely resets the thermal imaging camera 100 (S101) because a thermal image cannot be properly captured with the mechanical shutter 120 closed. If the malfunction of the mechanical shutter 120 is due to a problem associated with the shutter controller 125 or wire jamming, the malfunction of the mechanical shutter 120 may be addressed by resetting the thermal imaging camera 100.

Thereafter, the control unit 110 controls the mechanical shutter 120 to remain open (S102) in consideration that the mechanical shutter 120 may remain closed once closed again.

Thereafter, the control unit 110 measures the temperature of the thermal imaging sensor 130 or the mechanical shutter 120 with the temperature sensor 160 (S103) and determines whether the measured temperature satisfies a temperature variation condition (S104).

Here, the temperature variation condition refers to a case where the temperature of the thermal imaging camera 100 has varied by more than a predetermined amount (of, for example, 0.5° or greater), and the temperature of the thermal imaging camera 100 may be checked at intervals of a predetermined period (for example, every 4.5 minutes). Existing correction offset values may not be modified, but may be used as they are, if the temperature of the thermal imaging camera 100 has varied by more than the predetermined amount, but the predetermined period has not yet arrived, or if the predetermined period has arrived, but the temperature of the thermal imaging camera 100 has varied by less than the predetermined amount.

If a determination is made that the temperature variation condition is met ("Yes" in S104), the existing correction offset values are considered unreliable, and thus, the control unit 110 estimates (or interpolates) a correction offset value with reference to the mapping table stored in the storage 115 when the mechanical shutter 120 operates normally (S105).

The estimated correction offset value is applied to a current thermal image (S97), and a corrected thermal image obtained by S97 is finally output (S98).

Many modifications and other examples of the present disclosure will come to the mind of one skilled in the art having the benefit of the teachings presented in the foregoing descriptions and the associated drawings. Therefore, it is understood that the invention is not to be limited to the specific examples disclosed, and that modifications and examples are intended to be included within the scope of the appended claims.

What is claimed is:

1. A shutter operation state monitoring method performed in a thermal imaging camera, which includes a processor and a memory storing instructions that can be executed by the processor, by the instructions under the control of the processor, the shutter operating state monitoring method comprising:

controlling a shutter of the thermal imaging camera to be closed;
capturing a first thermal image;
calculating a correction offset value for the first thermal image;
controlling the shutter to be opened;
capturing a second thermal image;
applying the correction offset value to the second thermal image;
measuring a sound with a microphone while controlling the shutter to be closed or while controlling the shutter to be opened; and
determining whether the measured sound matches an operation sound of the shutter, wherein the measured sound does not match the operation sound and an alarm indicating malfunction of the shutter is output.

2. The shutter operation state monitoring method of claim 1, further comprising:
removing a common sound corresponding to noise from the measured sound.

3. The shutter operation state monitoring method of claim 1, wherein
the operation sound source is a reference sound source stored in advance for the shutter, and
an operation sound of the shutter being opened is distinguished from an operation sound of the shutter being closed.

4. The shutter operation state monitoring method of claim 1, further comprising:
the measured sound not matching the operation sound, and as a result, a state of the malfunction of the shutter being displayed by showing whether the malfunction of the shutter includes a malfunction in an open state or in a closed state of the shutter.

5. The shutter operation state monitoring method of claim 1, further comprising:
determining that the malfunction of the shutter includes a malfunction in an open state of the shutter, and as a result, applying a previous correction offset value before the malfunction of the shutter to a current thermal image.

6. The shutter operation state monitoring method of claim 5, wherein
the calculating the correction offset value, comprises calculating individual correction offset values for pixels included in the first thermal image,
the applying the correction offset value, comprises applying the individual correction offset values to pixels included in the second thermal image, and
positions of the pixels included in the second thermal image correspond to positions of the pixels included in the first thermal image.

7. A shutter operation state monitoring method performed in a thermal imaging camera, which includes a processor and a memory storing instructions that can be executed by the processor, by the instructions under the control of the processor, the shutter operating state monitoring method comprising:
measuring a sound with a microphone while controlling the opening and the closing of a shutter of the thermal imaging camera;
determining whether malfunction of the shutter has occurred by determining whether the measured sound matches an operation sound of the shutter;

determining that the malfunction of the shutter has occurred, and as a result, estimating a correction offset value with reference to a mapping table stored in a storage; and correcting a captured thermal image with the estimated correction offset value.

8. The shutter operation state monitoring method of claim 7, wherein the determining whether the malfunction of the shutter has occurred, comprises determining that the malfunction of the shutter has occurred by finding that a difference between characteristic values of the measured sound and the operation sound exceeds a reference value.

9. The shutter operation state monitoring method of claim 8, wherein each of the characteristic values includes at least one of level and frequency.

10. The shutter operation state monitoring method of claim 9, wherein the determining whether the malfunction of the shutter has occurred, further comprises determining that the malfunction of the shutter has occurred by finding that a difference between levels of the measured sound and the operation sound exceeds a first reference value and a difference between frequencies of the measured sound and the operation sound exceeds a second reference value.

11. The shutter operation state monitoring method of claim 7, wherein the mapping table includes data pairs including temperature measurements provided by a temperature sensor and correction offset values paired one-to-one with the temperature measurements.

12. The shutter operation state monitoring method of claim 11, wherein the estimating the correction offset value with reference to the mapping table, comprises, a correction offset value for a particular temperature not existing in the mapping table, and as a result, estimating the correction offset value for the particular temperature by performing interpolation based on the data pairs included in the mapping table.

13. The shutter operation state monitoring method of claim 11, wherein the mapping table is generated by a pre-calibration process and is stored in the storage before shipment of the thermal imaging camera.

14. The shutter operation state monitoring method of claim 13, wherein the estimating the correction offset value with reference to the mapping table, comprises a temperature measured by the temperature sensor satisfying a temperature variation condition of the measured temperature accounting for a larger fluctuation from an existing temperature than a reference value, and as a result, estimating the correction offset value with reference to the mapping table.

15. The shutter operation state monitoring method of claim 14, wherein the temperature variation condition is checked at intervals of a predetermined period.

16. The shutter operation state monitoring method of claim 11, further comprising:

a determination being made that the malfunction of the shutter has not occurred, and as a result, calculating a correction offset value through the opening and the closing of the shutter and storing the calculated correction offset value in the mapping table.

17. The shutter operation state monitoring method of claim 16, wherein the storing the calculated correction offset value in the mapping table, comprises storing the calculated correction offset value in the mapping table at intervals of a correction period, and the correction period is applied differently to a first period, which is a period from the thermal imaging camera being powered on to a thermal imaging sensor being stabilized, in comparison to a second period, which is a period after the thermal imaging sensor reaches a stable state.

18. The shutter operation state monitoring method of claim 17, wherein the correction period is shorter for the first period than for the second period.

19. The shutter operation state monitoring method of claim 7, wherein the malfunction of the shutter includes a malfunction in which the shutter remains closed without being able to be open, and the estimating the correction offset value with reference to the mapping table, comprises resetting the thermal imaging camera, controlling the shutter to remain open, measuring a temperature with a temperature sensor, and the measured temperature satisfying a temperature variation condition of the measured temperature accounting for a larger fluctuation from an existing temperature than a reference value, and as a result, estimating the correction offset value with reference to the mapping table.

20. The shutter operation state monitoring method of claim 19, wherein the temperature variation condition is checked at intervals of a predetermined period.

* * * * *